Jan. 7, 1958  E. C. CORNELL, JR  2,819,384
LUBRICANT FEEDER FOR WELDING APPARATUS
Filed Nov. 25, 1955
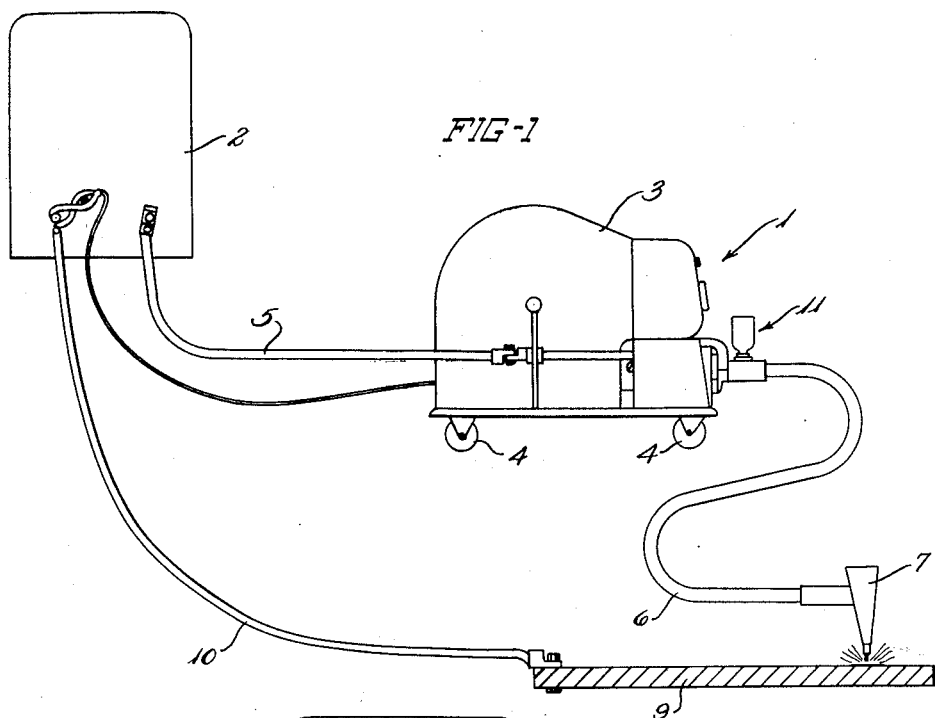
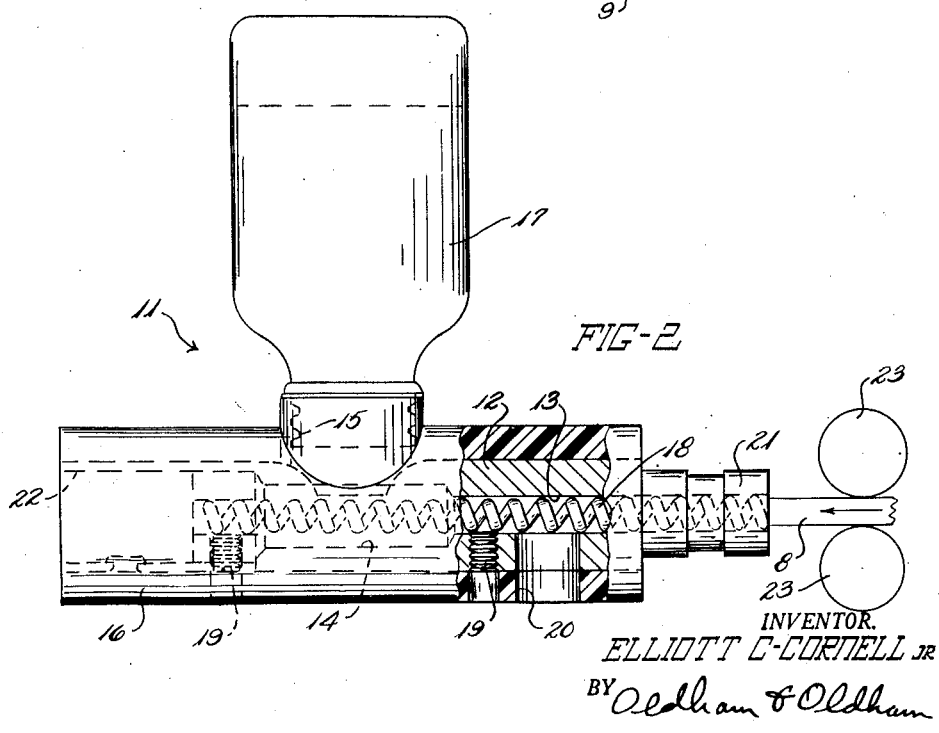
INVENTOR.
ELLIOTT C. CORNELL JR
BY Oldham & Oldham
ATTYS.

United States Patent Office 2,819,384
Patented Jan. 7, 1958

2,819,384

LUBRICANT FEEDER FOR WELDING APPARATUS

Elliott C. Cornell, Jr., Cleveland, Ohio, assignor to The Auto Arc-Weld Manufacturing Co., Cleveland, Ohio, a corporation of Ohio Application November 25, 1955, Serial No. 549,079

7 Claims. (Cl. 219—130)

This invention relates to lubricant feeders, and especially to a feeder for use with automatic welding apparatus.

One type of welding apparatus made at this time uses a manually positioned welding device or head that is connected to a movable welding electrode feed apparatus by a flexible, insulated tubular weld cable through which the welding electrode is forced by feed rolls engaging the electrode in the feed apparatus unit. Such welding electrode feed apparatus is connected to a welding energy supply machine by a flexible lead or leads so that the welding electrode feed apparatus has at least limited movement. Certainly the actual welding head or device is readily maneuverable and easily controlled by its operator for at least semi-automatic welding action for continuous electrode deposit.

However, in the use of such types of welding machines heretofore, there has been some difficulty in forcing the welding electrode through the flexible tubular weld cable in a uniform manner so that it has been difficult to maintain the arc length uniform and hence higher welding currents were used in some instances than actually were required. Also, the wire feed speed varied appreciably over a period of time so that frequent adjustments were required in the electrode feed mechanism to correct the erratic feeding action secured. Relatively high forces were required in many cases to push the weld electrode through the flexible welding cable and weld current contact nozzle as between 40 to 60 lb. forces, for example, would be required for such action. This put a relatively high load on the electrode feed means and the electrode feed rolls. Such pressure applied to the welding electrode produced some flattening of the electrode by the feed roll whereas chips and shavings from the electrode also were formed at a relatively rapid rate and they interfered with the feed of the wire through the weld cable, and produced consequent cable and weld nozzle wear.

The general object of the present invention is to provide a novel electrode feed mechanism for welding apparatus of the type described characterized by the constant lubrication of the weld electrode prior to feeding it through the welding cable.

A further object of the invention is to provide lubricant means in welding apparatus which does not interfere with the forced feed of the electrode or the provision of electrical welding energy at the portable welding head provided.

Another object of the invention is to provide means in apparatus of the type described wherein chips and shavings from the electrode wire produced by the forced feed roll action exerted thereon can be readily and automatically separated from the welding electrode prior to its entrance into the welding cable.

Another object of the invention is to provide means for facilitating forced feeding of a welding electrode through a tubular welding cable and nozzle at a uniform rate and with minimum force.

A further object of the invention is to provide a non- magnetic coil that surrounds the welding electrode at one portion of its travel through the lubricant feeder to permit separation of chips and shavings from the welding electrode prior to its entrance into the welding cable.

The foregoing and other advantages of the invention will be made more apparent as the specification proceeds.

Attention now is directed to the accompanying drawings, wherein:

Fig. 1 is an elevation of welding apparatus indicating the association of the lubricant feeder of the invention with the remaining components of the welding system; and Fig. 2 is an enlarged elevation of the lubricant feeder of Fig. 1 embodying the principles of the invention.

In referring to corresponding parts shown in the drawings and referred to in the specification, corresponding numerals are used to facilitate comparison between such equivalent parts.

The present invention, generally speaking, relates to electric welding apparatus wherein special lubricant means are provided in the apparatus and wherein a welding electrode is forced through a welding cable by remotely positioned driven feed means to a welding head for weld action. The novel portion of the apparatus particularly relates to the lubricant feeder portion of the combination of welding apparatus and with such lubricant feeder comprising a conductive block having male and female fittings provided at opposed end portions thereof for convenient connection of the lubricant feeder into welding apparatus, an insulation sleeve is provided around such connector block and connects to any suitable lubricant chamber provided therein for gravity flow of lubricant thereto for continually supplying lubricant as used. The conductive, or connector block has a longitudinally directed bore extending therethrough and a non-magnetic coil spring is positioned therein, extending through the lubricant chamber and suitably secured in position for passage of the welding electrode therethrough. A gravity acting chip drop out hole is provided in the connector block and connects to the coil spring so that any chips or shavings on the welding electrode can drop from the connector block and spring assembly by gravity action. The welding electrode extends through the coil spring and lubricant chamber for deposit of lubricant thereon, as the welding electrode is forced through the lubricant means and into a tubular welding cable connected thereto at the exit end thereof.

The welding apparatus of the invention is indicated as an overall combination by the numeral 1 and it includes a conventional welding generator 2, for example, of any known type and a welding control head or electrode feed apparatus 3. Such weld head may be portably mounted, as by means of casters 4. A cable 5 provides electrical energy to the weld head 3 whereas a tubular, flexible welding cable 6 extends from the control head 4. A flux hopper 7 is provided at the end of the weld cable 6 and the final electrical connection to an electrode wire 8 is made at such flux hopper head on the cable 6. A work piece 9 is connected to the welding generator 2 by a ground cable 10 to complete the welding circuit.

An important feature of the invention relates to a lubricant device 11 provided between the control head 3 and the welding cable 6. Reference is directed to Fig. 2 for the details of such lubricant device 11 and it is shown as comprising a conductive lubricant block 12, which block has a longitudinally extending bore 13 provided therein. The bore 13 connects to a lubricant chamber 14 provided in the conductive block 12. A lubricant supply bore or hole 15 is provided in an upper portion of the conductive block 12. An insulating sleeve or cover 16 is provided around the conductive block 12 to guard the lubricating device 11 and to prevent undesired electrical discharge. Any suitable lubricant such as particles of molybdenum disulfide, or graphite particles are positioned in an inverted container 17 in removable engagement with the hole 15 and conductive block 12 for supply of lubricant to the lubricating chamber 14. Thus as lubricant is used up or removed from the chamber 14, other lubricant will readily flow by gravity into such chamber.

As a feature of the invention to be described hereinafter in more detail, a non-magnetic coil spring 18 is received in the bore 13 of the conductive block and extends therethrough, which spring 18 is adapted to receive the welding electrode 8 and be in relatively snug contact therewith for passage of the welding electrode through such spring. The coil spring 18 preferably is held within block 12 as by means of set screws 19 received in the conductive block 12. This spring 18 can, for example, be made from stainless steel, or any other suitable non-magnetic material. It is desired that a non-magnetic spring be provided because electric energy passes through the welding electrode 8 and associated conductors when it is in the lubricating device 11 and any magnetic material therearound would be magnetized to prevent magnetic chips, dust or fragments from easily being separated from the electrode when in the block 12. A gravity type chip drop out hole 20 is provided in the lower portion of the lubricating block 12 and extends through the insulating sleeve 16 so that any of these chips or fragments carried into the coil spring 18 can fall through such non-magnetic spring because of the chip drop out hole 20 and the spaced relationship of adjacent convolutions of the spring. The coil spring 18 closely encompasses the electrode 8 to remove metal chips and fragments carried by the electrode into such spring.

The block 12 has a male connector fitting 21 provided on one end thereof, which fitting is adapted to engage with, or be secured to the control head 3 by a quickly connectable type of a coupling. A recessed socket, or female fitting 22 is provided on the opposite end of the conductive block 12 for receiving a male fitting provided on the weld cable 6. Hence, electrical energy is primarily transmitted through the lubricating device 11 by the conductive block 12 as the current flows from the control head 3 to a tubular conductor provided in the weld cable 6. Some energy likewise flows through the spring 18 and through the weld electrode 8 as it passes into and through the lubricating device 11.

It will be realized that feed rolls 23 for the welding electrode 8, diagrammatically shown in Fig. 2, are provided in the control head 3 so that the welding electrode 8 is being forced into and through the lubricating device 11 by forces applied to the welding electrode prior to its entrance into the conductive block 12. Such forces likewise must be transmitted to the welding electrode present in and being forced through the welding cable 6.

In operation of the invention, it has been noted that the forces applied to the welding electrode 8 by the feed rolls in the control head can be reduced in magnitude in relation to prior practices but yet have a smooth, uniform flow of the welding electrode to the weld point. By use of only a small amount of lubricant, wear and tear on the weld cable 6 also is greatly reduced as the welding electrode slips readily therethrough. As the chips and metal pieces adhering to the electrode 8 are removed through the hole 20 in the lubricant feeder, wear in the weld cable is thus further reduced and convenient passage of the welding electrode therethrough is facilitated.

It should be realized that the container 17 should be made from non-conductive material to prevent passage of electrical energy thereto.

It will be seen that the lubricating device 11 can be added to the welding apparatus 1 or removed therefrom, as desired, but that such addition or removal of the lubricant means will not take much time and will not otherwise affect the welding action. Initially in starting up the welding apparatus 1, it will be desirable to remove the container 17 from engagement with the conductive block 12 and squirt some lubricant or otherwise force it into the welding cable 6 to facilitate easy passage of the welding electrode therethrough.

In view of the foregoing, it is believed that the objects of the invention have been achieved, as a relatively inexpensive, uncomplicated but serviceable lubricating device has been provided for welding apparatus of the class described. This lubricant feeder functions automatically and effects or permits a smooth, steady feed of the welding electrode through the welding cable and associated means. Wear and tear on the welding cable is also reduced or eliminated. Furthermore, the lower pressure feed roll loads reduce the forces on the welding electrode and reduces the chipping or shaving cut therefrom by the electrode feed and hence likewise contributes to the reduction of interference with the feed of electrode through the welding cable so that the objects of the invention have been achieved.

It will be realized that the lubricant feeder 11 could be built permanently in the welding apparatus, if desired, and that no special fittings would be required.

For final electrical contact with the electrode wire 8, the flux hopper 7 and associated means has snug engagement with such wire.

While one complete embodiment of the invention has been disclosed herein, it will be appreciated that modification of this particular embodiment of the invention may be resorted to without departing from the scope of the invention as defined in the appended claims.

What is claimed is:

1. In combination in a welding machine using an elongate electrode wire, a tubular welding cable through which the electrode wire extends for welding action; and a lubricating member engaging said welding cable at one end thereof, said lubricating member having a lubricating chamber therein through which the electrode wire is adapted to extend, means for automatically supplying a lubricant to said lubricant chamber, and means for removing small particles of material on and protruding from an electrode wire as it is moved through the lubricating member.

2. A lubricating member for welding apparatus, which member comprises a conductive block having an entrance end and having an axially extending lubricant chamber therein, a lubricant supply member carried by said block and connected to said lubricant chamber for gravity flow of lubricant thereto, an axially directed non-magnetic coil spring in the bore of said block in advance of said chamber for having an electrode wire forced therethrough, said spring closely encompassing said wire to knock small chips therefrom, said block having a chip drop out hole in a bottom portion thereof connecting to said coil spring in advance of said chamber in relation to the normal path of movement of an electrode wire therethrough, means for securing said coil spring in said block, and fitting means at end portions of said block for connecting it in a welding apparatus.

3. A lubricating member for welding apparatus, which member comprises a lubricant block having an entrance end and having an axially extending lubricant chamber therein, an insulating sleeve, a lubricant storage member carried by said block and connected to said lubricant chamber for gravity flow of lubricant thereto, an axially directed non-magnetic coil spring in said block and protruding towards the entrance end thereof, said block and sleeve having a chip drop out hole in a bottom portion thereof connecting to said coil spring in advance of said chamber, and fitting means on the ends of said block for securing it to members in a welding apparatus.

4. A lubricating member for welding apparatus, which member comprises a conductive block having an entrance end and having an axially extending lubricant chamber therein, an insulating sleeve, a lubricant storage member carried by said block and connected to said lubricant chamber for gravity flow of lubricant thereto, and fitting means on the ends of said block for securing it to members in a welding apparatus.

5. A lubricating member for welding apparatus, which member comprises a conductive tubular block having an entrance end and having an axially extending lubricant chamber therein, a lubricant storage member carried by said block and connected to said lubricant chamber for gravity flow of lubricant thereto, and an axially directed non-magnetic coil spring in the bore of said block in advance of said chamber, said block having a chip drop out hole in a bottom portion thereof connecting to said coil spring in advance of said chamber.

6. A lubricating member for welding apparatus, which member comprises a tubular block having an entrance end and having an axially extending lubricant chamber therein, a lubricant storage member carried by said block and connected to said lubricant chamber for gravity flow of lubricant thereto, and an axially directed stainless steel coil spring having spaced coil convolutions positioned in said chamber and protruding towards the entrance end of said block for passing an electrode wire therethrough to remove particles loosely carried thereby, said block having a chip drop out hole in a bottom portion thereof connecting to said coil spring in advance of said chamber.

7. A lubricating member for welding apparatus, which member comprises a tubular block having an entrance end and an axially directed non-magnetic coil spring having spaced coil convolutions positioned in said block adjacent the entrance end thereof for receiving and passing an electrode wire therethrough to remove particles loosely carried thereby, said block having a chip drop out hole in a bottom portion thereof connecting to said coil spring to receive metal chips knocked off of an electrode wire by said coil spring by gravity action.

References Cited in the file of this patent

UNITED STATES PATENTS

| | | |
|---|---|---|
| 1,589,108 | Caretta | June 15, 1926 |
| 1,953,915 | Burgett et al. | Apr. 3, 1934 |
| 1,959,194 | Chapman | May 15, 1934 |